US011226247B2

(12) United States Patent
Agrawal et al.

(10) Patent No.: US 11,226,247 B2
(45) Date of Patent: Jan. 18, 2022

(54) APPARATUS AND METHOD FOR TESTING LIQUID PROPELLED ROCKET

(71) Applicant: Atlantis Educational Services, Inc., Kennedy Space Center, FL (US)

(72) Inventors: Abhishek Agrawal, Titusville, FL (US); Andrew Gafford, League City, TX (US); Ryan Elliot, Hermosa Beach, CA (US)

(73) Assignee: Atlantis Educational Services, Inc., Kennedy Space Center, FL (US)

( * ) Notice: Subject to any disclaimer, the term of this patent is extended or adjusted under 35 U.S.C. 154(b) by 0 days.

(21) Appl. No.: 17/204,402

(22) Filed: Mar. 17, 2021

(65) Prior Publication Data
US 2021/0293640 A1 Sep. 23, 2021

Related U.S. Application Data

(60) Provisional application No. 62/991,177, filed on Mar. 18, 2020.

(51) Int. Cl.
*G01L 5/14* (2006.01)
(52) U.S. Cl.
CPC ..................... *G01L 5/14* (2013.01)
(58) Field of Classification Search
CPC ..... G01L 5/14; F02K 9/96; F41F 3/04; A63H 27/005

USPC .......................................................... 73/167
See application file for complete search history.

(56) References Cited

U.S. PATENT DOCUMENTS

| 3,122,917 A | 3/1964 | Ormond |
| 2012/0205488 A1* | 8/2012 | Powell .................. B64C 39/024 244/63 |

FOREIGN PATENT DOCUMENTS

KR    1020200057471    5/2020

OTHER PUBLICATIONS

GK and PK, Air command water rockets day 57 log (Year: 2008).*
(Continued)

*Primary Examiner* — Michael P Nghiem
*Assistant Examiner* — Dacthang P Ngo
(74) *Attorney, Agent, or Firm* — Lott & Fischer, P.L.

(57) ABSTRACT

Disclosed is an apparatus for testing a water rocket and a method for use thereof, comprising a load cell assembly, a launcher assembly, a rocket assembly, and a base piston, all situated within a housing. Air and/or water pressurizes the rocket assembly and the launcher assembly, which is released to cause the rocket to exert a propelling force on the rocket. The load cell is adapted to capture and record the thrust of the water rocket. The housing is adapted to retain the released water within the housing. The base piston is adapted to move the launcher assembly out of the way of the releasing water and air, whereby the launcher assembly does not impede the exit of the water or air that could result in inaccurate data.

9 Claims, 12 Drawing Sheets

(56) References Cited

OTHER PUBLICATIONS

Santos, et al.—"Development of Test Stand for Experimental Investigation of Chemical and Physical Phenomena in Liquid Rocket Engine"—J. Aerosp.Technol. Manag., Sao José dos Campos, vol. 3, No. 2, pp. 159-170, May-Aug. 2011.

"Day 67—Test Stand Work" (Air Command Water Rockets)—www.aircommandrockets.com/day67.htm—Sep. 21, 2008.

International Application No. PCT/US21/22745—Patent Cooperation Treaty PCT International Search Report—Completed May 4, 2021 (dated Jun. 4, 2021).

International Application No. PCT/US21/22745—Patent Cooperation Treaty PCT Written Opinion of the International Searching Authority—Completed May 4, 2021 (dated Jun. 4, 2021).

\* cited by examiner

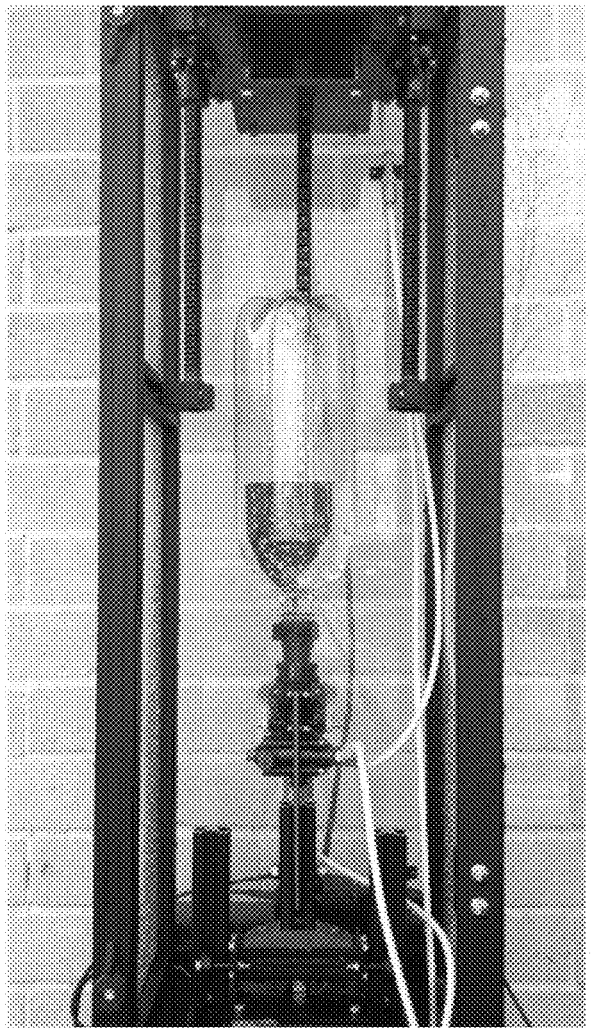 
*FIG. 7A*  *FIG. 7B*

APPARATUS AND METHOD FOR TESTING LIQUID PROPELLED ROCKET

CLAIM OF PRIORITY

This application is being filed as a non-provisional patent application under 35 U.S.C. § 111(a) and 37 CFR § 1.53(b). This application claims priority under 35 U.S.C. § 119(e) to U.S. provisional patent application Ser. No. 62/991,177 filed on Mar. 18, 2020, the contents of which are incorporated herein by reference.

FIELD OF INVENTION

The invention relates generally to devices, such as liquid propelled rockets, used to teach principles of the operation of rockets. In particular, the present invention is directed to an apparatus for testing the performance of liquid propelled rockets, such as water rockets, and methods for using the same.

BACKGROUND OF THE INVENTION

Liquid propelled rockets, and more specifically water rockets, are commonly used to demonstrate and learn about the principles of rocket engines and Newton's third law of motion. They provide a safe and fun way to replicate the launch of a rocket using simple, inexpensive components. These types of rockets can be used by teachers and educators to demonstrate the laws of physics and their flight paths can be related back to specific mathematical equations. Thus, water rockets are a useful tool in teaching science, as well as gaining students' interest in the study of physics and mathematics.

However, due to the chaotic nature of such rockets' flight paths, it is difficult to measure and record data from the launch of the rockets, such as the rocket's thrust over the course of its flight. Further, the expulsion of water from the rocket during launch makes any attempt at launching a rocket indoor and recording this flight data extremely difficult. The present disclosure overcomes these inherent flaws by providing an apparatus and method for testing water rocket engines indoors and accurately recording data from the launch of the rocket. Additional details of the present invention are discussed below.

SUMMARY OF THE INVENTION

Small rockets, particularly water rockets, are a teaching tool commonly used in a variety of subjects in the STEM (science, technology, engineering, and mathematics) curriculum. By studying the performance and principles behind water rockets, teachers can craft coursework relevant to a large set of STEM subjects. For example, students can learn and document their abilities with the following concepts: inertia, gravity, air resistance, Newton's laws of motion, acceleration, relationships between work and energy or impulse and momentum, projectile motion, freefall calculations, and internal and external ballistics, not to mention the practice of true engineering and the scientific method.

Water rockets provide a safe and engaging way to replicate the launch of a rocket using simple, inexpensive components. In sum, water rockets are a useful tool in teaching science, as well as developing students' interest in the study of physics, engineering, and mathematics.

In teaching students about the principles behind water rockets, it is common to use a variety of tools and sensors to record for later analysis several performance parameters during flight cycle of the rocket. For example, it is often useful to record, in real-time, the thrust generated by the rocket from the moment of launch until the end of powered flight. However, due to the chaotic and fast-paced nature of a water rocket launch, and the often-great distances traveled by water rockets, field testing is generally very difficult and inaccurate.

Accordingly, it has been very difficult to easily and inexpensively measure and record data from the launch of water rockets, such as the rocket's thrust over the course of its flight. Further, the expulsion of water from the rocket during launch makes any attempt at launching a rocket indoor and recording this flight data extremely difficult. The present disclosure overcomes these inherent flaws by providing an apparatus and method for testing water rocket engines indoors and accurately recording data from the launch of the rocket.

The disclosed apparatus comprises the following components: a housing, a load cell assembly, a launcher assembly, a rocket assembly, and a base piston. The load cell assembly, the launcher assembly, the rocket assembly, and base piston are all situated within the housing. A hose may run from the exterior of the housing to the launcher assembly and/or the rocket assembly, whereby water or air may be supplied to the launcher assembly or the rocket assembly. The supply of air and/or water pressurizes the rocket assembly and the launcher assembly, which may then be released to cause the rocket to exert a force in a direction opposite to the direction of the release of water and air. The load cell is adapted to capture and record the thrust of the water rocket. The housing is adapted to retain the released water within the housing. The base piston is adapted to move the launcher assembly out of the way of the releasing water and air, whereby the launcher assembly does not impede the exit of the water or air that could result in inaccurate data.

The method herein disclosed comprises the following steps: filling the rocket assembly with the desired amount of water; loading the rocket assembly onto the launcher assembly; raising the rocket assembly to the load cell assembly; arming the launcher assembly and locking the rocket assembly in place; adjusting the load cell assembly to ensure that the load cell assembly is at an optimal distance from the top of the rocket assembly (in some embodiments approximately 25 mm); pressurizing the rocket assembly to the desired gas pressure; conducting a further adjustment of the distance between the load cell assembly and the top of the rocket assembly; triggering the release of the rocket assembly; moving the launcher assembly away from the ejecting water and air; and recording the data from the thrust of the rocket upon the load cell assembly. During the launch, the rocket assembly maintains contact with the load cell throughout the thrust phase to avoid losing any thrust data. Periods of lost contact during thrust phase results in loss of recorded data.

Additional details regarding the operation of the disclosed apparatus and method are included in the following description which includes non-limiting embodiments of certain aspects of the invention.

BRIEF DESCRIPTION OF THE DRAWINGS

FIGS. 7A-7K, illustrate the sequence of launch and flight of a water rocket being tested in an apparatus according to the present invention.

DETAILED DESCRIPTION OF THE INVENTION

Apparatus

The present specification discloses an apparatus and method for testing a water rocket and the recording of operational data from the simulated powered flight of the water rocket. The major components of the apparatus comprise a housing, a load cell assembly, a launcher assembly, a rocket assembly, and a base piston. In some embodiments, the apparatus may further comprise one or more circuit boards, and one or more pneumatic controllers, such as solenoid motors and/or flow regulators, to control the actuation and timing of various components of the apparatus.

Figure 1:
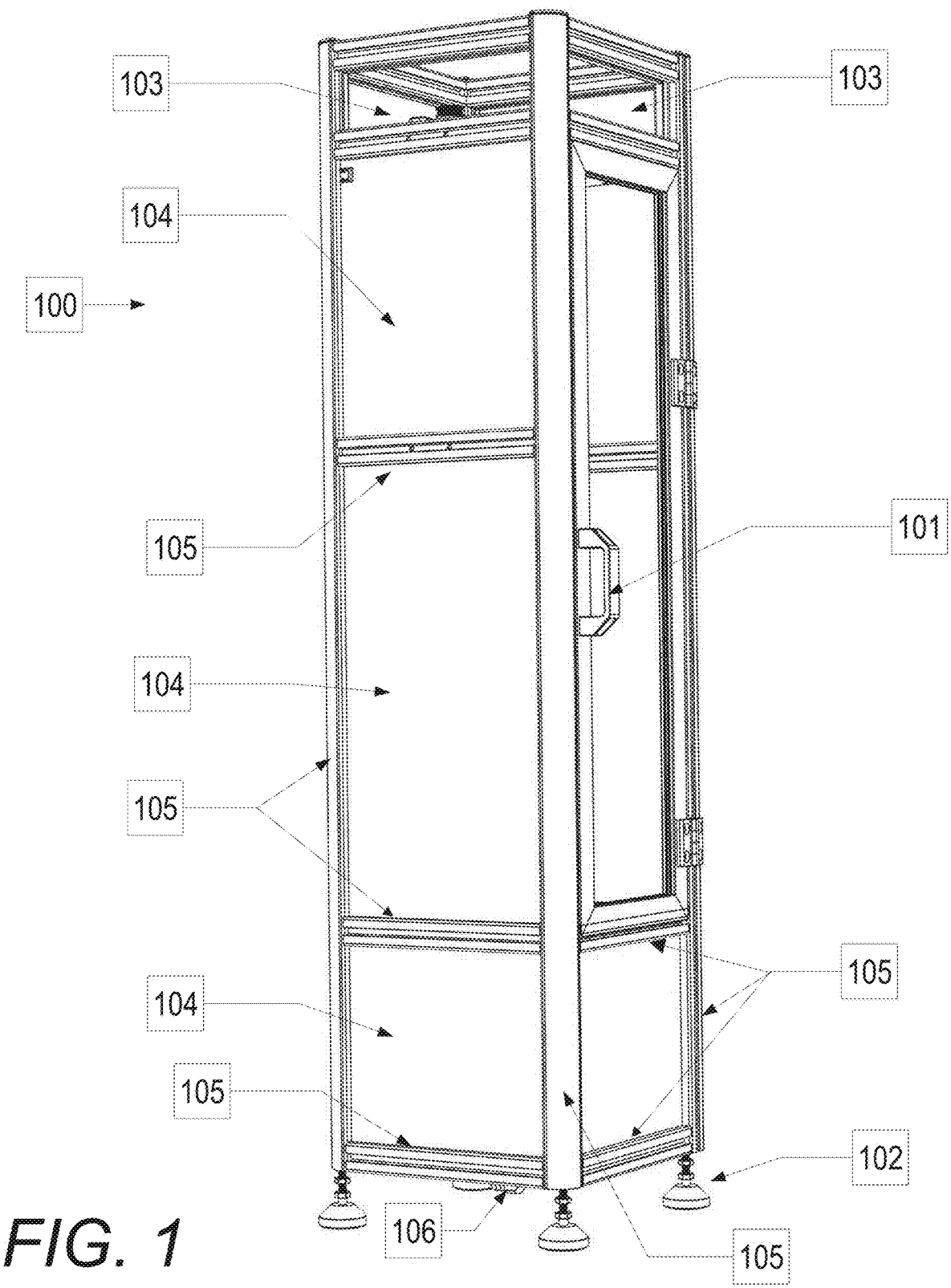
FIG. 1 is an external illustration of the housing in one embodiment of the present invention.
Figure 2:
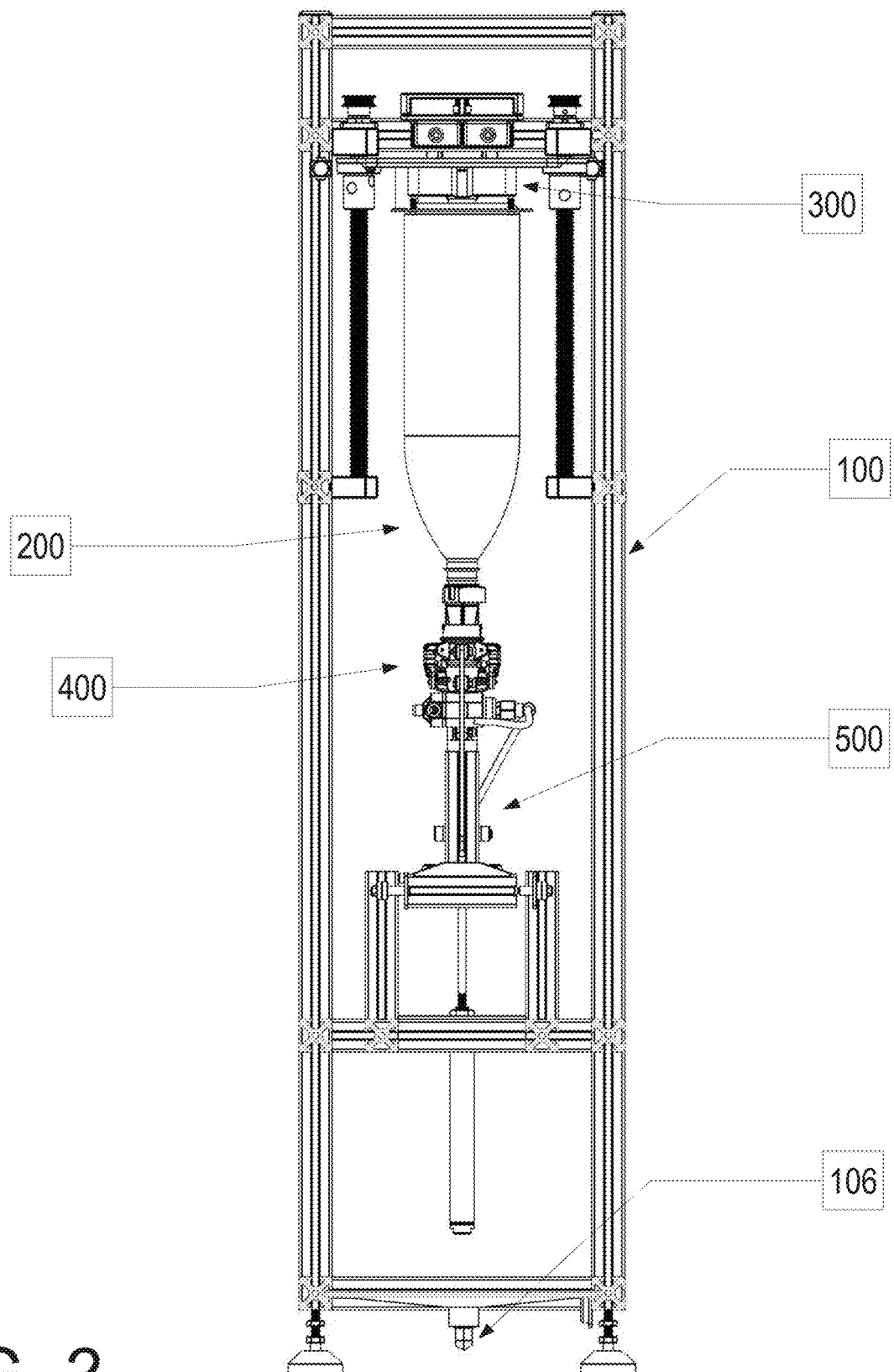
FIG. 2 is an illustration showing the fitment of the water rocket testing apparatus of the present invention within the housing.

Referring first to FIG. 1, shown is an exterior view of the housing (100). FIG. 2 illustrates the various other main components located within the housing, with the door (101) of the housing removed for purposes of visibility of interior components. The housing is adapted to house the other main components of the apparatus, including the load cell assembly (300), the launcher assembly (400), the rocket assembly (200), and the base piston (500). The housing is further adapted to retain the rocket assembly (200) within its interior upon launch of the rocket assembly, as well as any water ejected from the rocket assembly during the launch, which will eventually exit the housing through a drain (106).

In the shown embodiment, the housing (100) comprises a rectangular cabinet comprised of multiple frame members (105) and wall members (104). However, the housing (100) may have virtually any shape, including cylindrical, prismatic, or any other shape suitable to house the required components. The wall members may completely envelop the exterior of the housing (100) or there may be portions of the exterior (103) which are devoid of wall members and may vent the interior of the housing (100) to the exterior. Wall members (104) may be opaque, or in a preferable embodiment they may be transparent to permit visibility of the interior components. The wall members (104) may also be a combination of opaque and transparent components.

The housing (100) may also be closed at a top end and a bottom end or the top end and the bottom end may be left substantially open. In one embodiment, the bottom end of the housings comprises a drain (106), whereby water expelled from the rocket assembly may be drained from the apparatus. Additionally, a plurality of legs (102) may be provided to permit the bottom of the housing (100) to be elevated above the ground to permit full evacuation of water through the drain (106).

The housing may also comprise a door (101) on one of its walls, whereby the interior of the housing may be accessed through its opening. The door (101) may further comprise a safety switch (not shown), whereby the apparatus will not function while the door is in an open position. The safety switch may be a mechanical, electrical, or magnetic switch that physically or electrically impedes the launch of the rocket assembly or the pressurization of the rocket assembly or the launcher assembly.

The housing provides support for the load cell assembly (300) and the launcher assembly (400), whereby the load cell assembly (300) and the launcher assembly (400) are temporarily or permanently attached to the housing (100).

Figure 3:
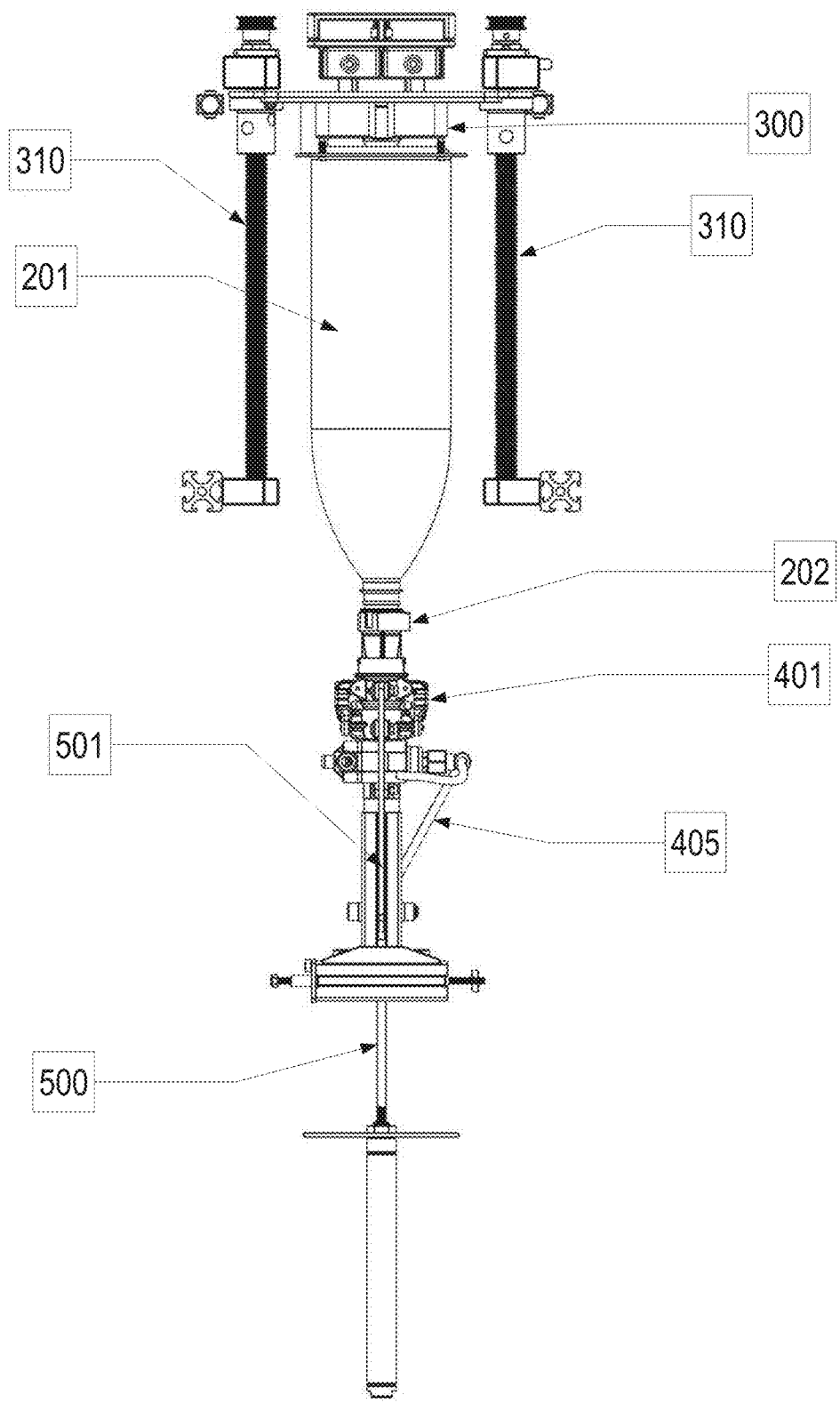
FIG. 3 is a frontal view of the water rocket testing apparatus of the present invention with the housing not shown for clarity.
Figure 4:
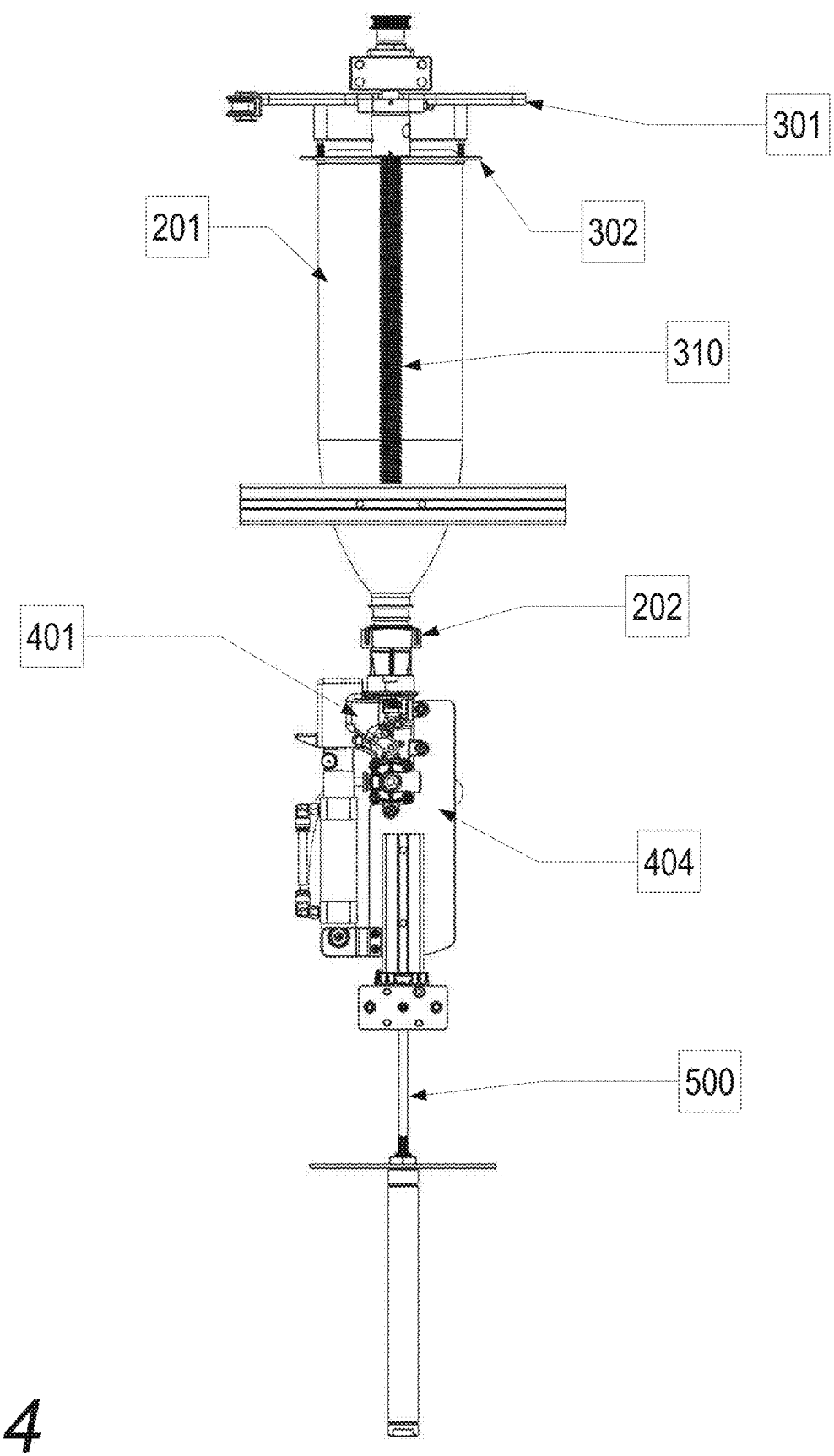
FIG. 4 is a side view of the water rocket testing apparatus of the present invention with the housing not shown for clarity.
Figure 5:
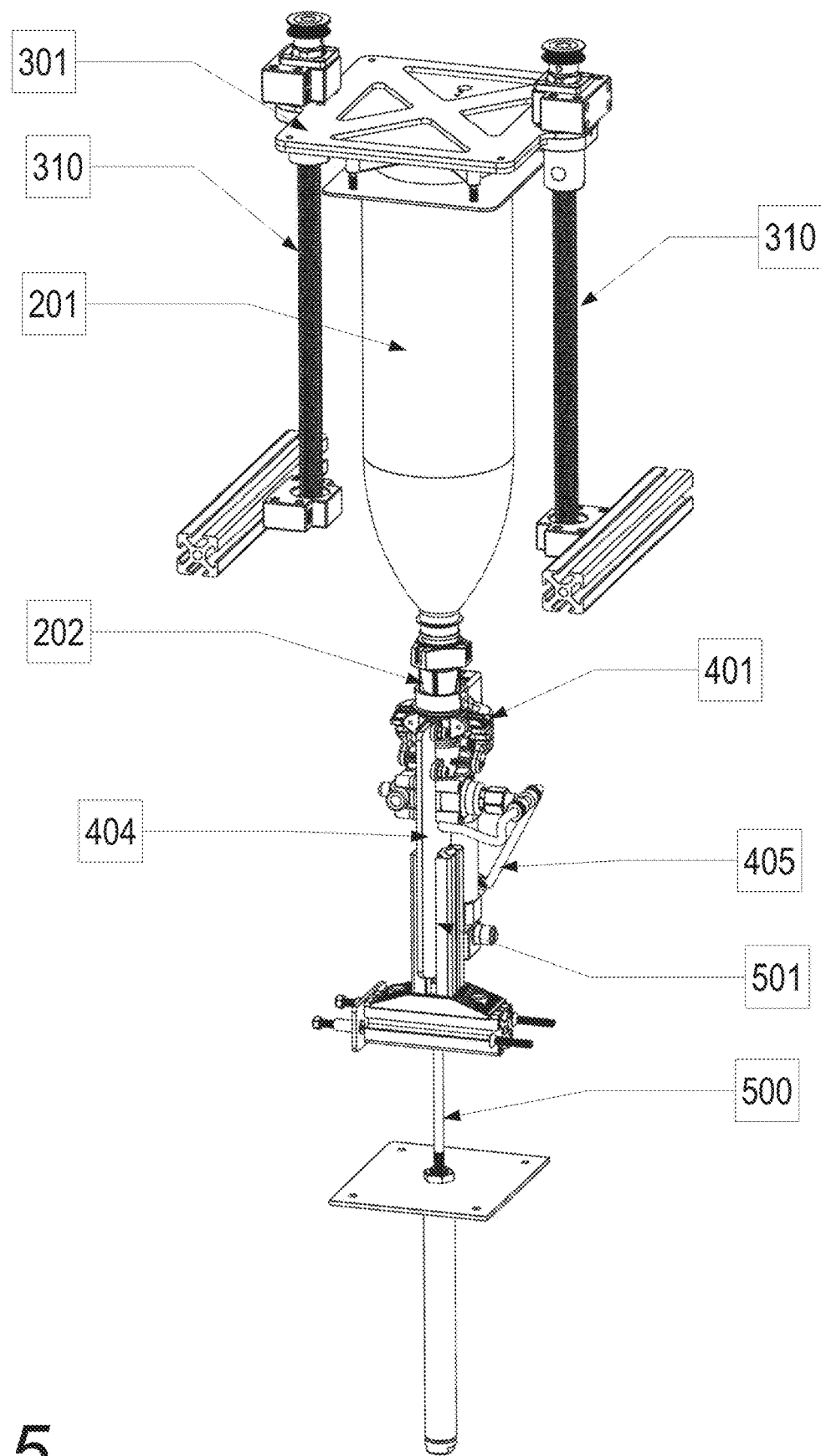
FIG. 5 is a perspective view of the water rocket testing apparatus of the present invention with the housing not shown for clarity.

Referring next to FIGS. 3, 4 and 5, the rocket assembly (200) may comprise a pressure vessel (or bottle) (201) and a nozzle (202). The pressure vessel (201) is typically a polyethylene terephthalate (PET) bottle, such as a carbonated soft drink bottle. However, the pressure vessel may comprise any material and configuration, if it is substantially water-tight, airtight, and has only a single, relatively narrow, opening for a nozzle (202). The nozzle (202) of the rocket assembly (200) may be a separate component from the pressure vessel (201), or the pressure vessel (201) may be integrated with the nozzle (202). The rocket assembly may further comprise fins, a nose cone, or other stabilizers (not shown).

Prior to launch of the rocket assembly, a liquid, which acts as the propellant, is introduced into the pressure vessel (201). The liquid may be added prior to the rocket assembly (200) being placed within the housing (100) or it may be added while situated within the housing (100) via a hose (405) in the launcher assembly (400). The amount of liquid used may vary depending on the parameters of the test and the design of the experiment. The liquid is typically water, but any other liquid may be used within the pressure vessel. The pressure vessel is also adapted to hold pressurized gas in addition to the liquid, which may similarly be introduced into the pressure vessel via hose (405) or via a separate hose. The gas may be air, or any other substantially compressible gas that is less dense than the liquid. As additional gas is introduced and forced into the pressure vessel, (200), the gas compresses and pressurizes. The amount and final pressure of the of gas may vary depending on the parameters of the test and the design of the experiment.

When the apparatus is in a fully assembled position, the nozzle (202) of the rocket assembly (200) is situated at a bottom end of the rocket assembly and below the pressure vessel (201). Due to gravity, and the density of the liquid being greater than that of the pressurized gas, the liquid within the pressure vessel migrates down proximate the nozzle. The gas, in turn, migrates to the top of the pressure vessel (201). Gas may be continually introduced into the pressure vessel (201) until the desired gas pressure is reached and additional gas may thereafter be introduced, or gas may be removed, if the pressure changes prior to launch. A manual purge valve (not shown) for removal of gas from the pressure vessel (201) may also be present in some embodiments to safely depressurize the pressure vessel (201) in the event of a power failure.

The rocket assembly (200) sits atop the launcher mechanism (400) The nozzle (202) is covered by the trigger mechanism (401) of the launcher assembly (400). The trigger mechanism (401) may comprise a valve, stopper, or gate which, when open or withdrawn, permits liquid to escape the pressure vessel (200) because of pressure exerted by the gas.

During a launch of the rocket assembly, the pressurized gas forces liquid to escape the pressure vessel (201) via the nozzle (202). In accordance with Newton's third law of motion, the force of the escaping liquid downward through the nozzle creates thrust in the opposite, upward direction. Water rocket engine tests can only be conducted in situations where the liquid is closer to the source of gravity, so that the compressed gases push the liquids out, and, in accordance with the law of conservation of momentum, the ejected liquid imparts momentum to the rocket.

In one embodiment, the trigger mechanism (401) is adapted to clamp the rocket assembly (200) in place during pressurization of the rocket assembly and impede the pressurized air and fluid in the pressure vessel (201) from escaping through the nozzle (202) prior to the launch of the rocket assembly. The trigger mechanism (401) may be activated to allow release of the pressurized air and liquid within the pressure vessel (201) through the nozzle (202), causing the launch of the rocket assembly. The trigger mechanism (401) may be activated through the deployment of a pneumatic or hydraulic piston. Alternatively, the trigger mechanism may be controlled using an electrical signal capable of locking and releasing the trigger mechanism. Other means, such as a manual mechanical release, may be used to operate the trigger mechanism (401).

The launcher assembly (400) may further comprise an adapter or connecting element adapted to attach attaching the trigger mechanism to a base piston (500). One purpose of the base piston (500) is to separate the trigger mechanism (401) from the nozzle (201), as quickly as possible upon launch so that the launcher assembly (400), and particularly the trigger mechanism (401) does not interfere with the performance of the rocket assembly (200).

In one embodiment, the adapter comprises a face plate (404) adapted to reside within a vertical slot (501) of the base piston (500). This configuration aids in the proper positioning of the launcher assembly and the rocket assembly relative to the housing (100) and the load cell assembly (300). The face plate (404) may be removably attached to the vertical slot (501), thereby allowing for the movement of the base piston (500) to effect a corresponding movement of the launcher assembly (400).

In one embodiment, the face plate (404) and the vertical slot (501) are attached by a rod or lock residing in mating holes of the face plate (404) and the vertical slot (501). In another embodiment, the vertical slot (501) may be clamped down onto the face plate (404). Although disclosed as using a face plate and vertical slot, the launcher assembly and the base piston may be attached by any method known in the art for attaching separate components. Alternatively, the base piston and the launcher assembly may be a single, integral component. Although the launcher assembly is disclosed as featuring the above components, any configuration of a launcher assembly known in the art may be used for triggering the launch of the rocket assembly (200).

The base piston (501) may serve two purposes. The first is to raise the rocket assembly up to the load cell assembly (300) prior to launch, so that the upper end of the pressure vessel (201) (or an attached nose cone) is in direct contact with, or near, the load cell assembly (300) at the time of launch. This allows for an accurate and smooth reading of the thrust of the rocket assembly during simulated flight. If the upper end of the pressure vessel (201) were not in contact with the load cell assembly (300) at the time of launch, there is a significant risk that during launch, the sudden violent impact of the pressure vessel (201) with the load cell assembly (300) could cause damage to the apparatus and/or result in inaccurate readings. This arrangement also allows for a variety of water rocket engines to be used of various volumes and shapes.

The second purpose, which was previously mentioned, is to quickly move the launcher assembly (400) away from the rocket assembly (200) upon launch. Upon the activation of the trigger mechanism (401), which in turn triggers the launch of the rocket assembly (200), the base piston (500) is simultaneously, or nearly simultaneously, triggered to actuate downward, thereby moving the launcher assembly (400) away from the rocket assembly (200) and the liquid and gas expelling from the nozzle (202) of the rocket assembly (200). The launcher assembly (400) is moved away from the rocket assembly (200) upon launch because a portion of the thrust may impinge upon by the launcher assembly (400) during the expulsion of the liquid and gas, causing "back pressure" an inaccurate measurement of the thrust of the rocket assembly (200).

Although the illustrated embodiments show the base piston (500) below the launcher assembly (400) and actuating downward to move the launcher assembly (400), a lateral, curvilinear, or other type of movement of the launcher assembly (400) away from the ejecting liquid and gas of the rocket assembly (200) is within the scope of this disclosure. The base piston (500) may be affixed within the housing (100) or may be a separate component. Other methods may also be used to separate the launcher assembly (400) from the rocket assembly (200) during launch, these include having the trigger mechanism (401) be a free-standing component that is secured only to the nozzle (202) just prior to launch and is ejected away from the nozzle (202) by a combination of gravity and the force of the liquid expelled from the rocket assembly (200) upon launch.

In one embodiment of the disclosure, the trigger mechanism (401) further comprises a piston that is pressurized prior to the pressurization of the pressure vessel (201). Upon release of pressure within the piston, the trigger mechanism (401) releases the rocket assembly (200), initiating its launch. The piston of the trigger mechanism (401) and the base piston (500) may be controlled by a single actuator.

In another embodiment of the disclosure the piston of the triggering mechanism (401) and the base piston (500) may be controlled by two actuators, allowing for the fine tuning of the timing of the launch and movement of the launcher assembly (400). In an alternative embodiment, the launch of the rocket assembly (200) and downward movement of the launcher assembly (400) occur nearly simultaneously. This allows for the rocket assembly (200) to remain in contact with the load cell assembly (300) at all time, while also allowing the expelling water and air to exit the nozzle (202) unimpeded, thereby removing anomalies in any data recordation.

In some embodiments, the base piston (500) may be connected to a flow regulator (not shown) which can slow down the rate of movement of the base piston (500) in one direction, while allowing for a faster rate of movement in the other direction. For example, a flow regulator may be used to slow down the speed of movement of the base piston (500) in the upward direction, when the top of the rocket assembly (200) is being positioned in close proximity to the load cell assembly (300), while permitting the base piston to move faster in the opposite direction, when the base piston (500) is used to separate the launcher assembly (400) from the rocket assembly (200) during launch.

In some embodiments, the apparatus may further include visual indicia, such as an LED light, or an array of LED lights, to indicate the launch stage. In addition, a countdown timer display may also be incorporated as well as displays showing other parameters, such as gas pressure and thrust, in real time.

Figure 6:
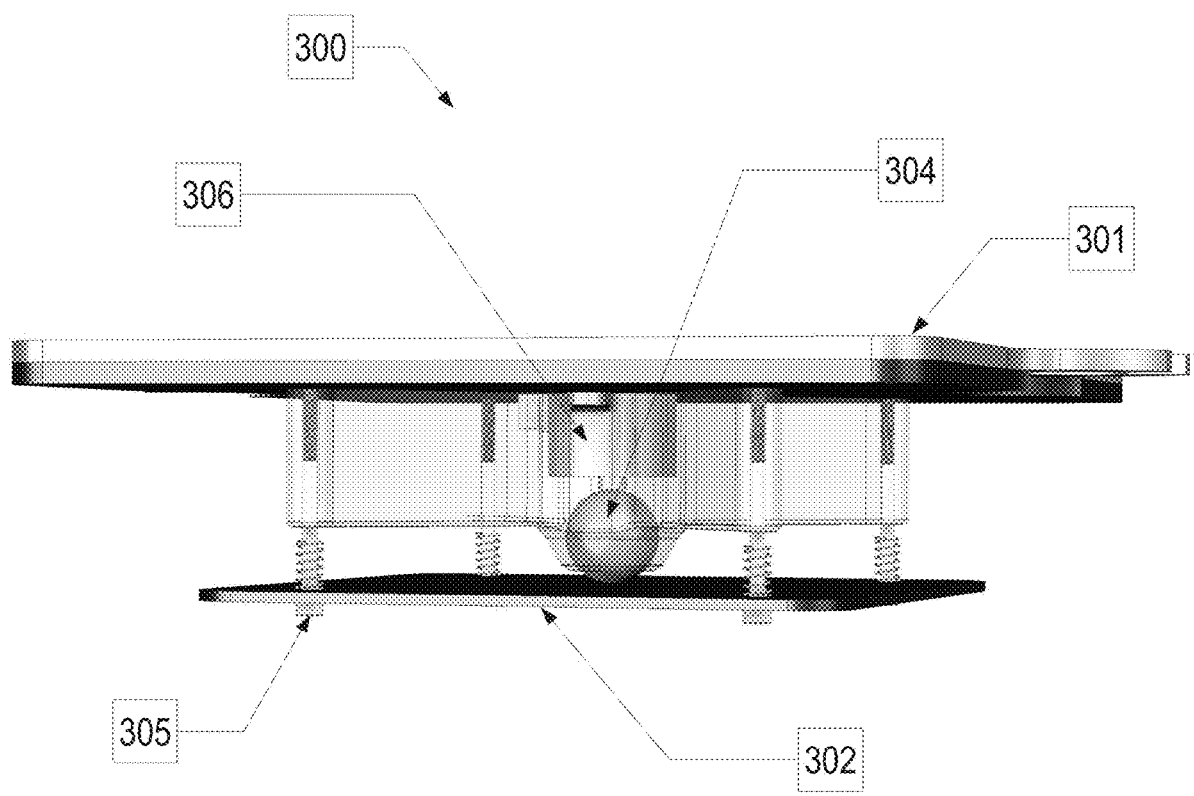
FIG. 6 is an external illustration of the load cell assembly of the present invention and its various components.

Referring next to FIG. 6, shown is a detailed view of the load cell assembly (300). The load cell assembly (300) is situated above the upper end of the rocket assembly (200). The load cell assembly (300) is adapted to read and record the thrust generated by the rocket assembly (200) throughout its simulated flight. In one embodiment of the load cell assembly (300), the load cell assembly (300) comprises contact plate (302), a ball (304), a load cell transducer (306), a housing (303) (shown transparent for clarity) and a support plate (301). The contact plate (302) is situated at a bottom end of the load cell assembly (300) and is adapted to remain in contact with the rocket assembly (200) throughout its launch. The contact plate is supported by spring-loaded screws (305), which are in turn connected to the support plate (301). The spring-loaded screws (305) ensure that the top surface of the contact plate (302) is in continuous contact with a bottom end of the ball (304) and that the contact plate (302) can further move upward to generate a greater force onto the ball (304). The top end of the ball is in direct contact with load cell transducer (306) which is adapted to generate an electrical signal proportional to the force generated by the ball (304) upon the load cell transducer (306).

The load cell transducer (306) is in turn attached to the support plate (301). In one embodiment, ball (304) is a spherical metallic ball, and the contact and support plates are comprised of carbon fiber. The ball (304) may also be housed within a ball housing, whereby the location of the ball (304) may be fixed relative to the contact plate and support plate. In an alternative embodiment (not shown), the ball (304) may be replaced by a differently shaped component, such as a rod or a bell, which can directly transfer pressure from the contact plate (302) to the load cell transducer (306).

The configuration of the load cell assembly (300) allows for the force generated by the launch of the rocket to translate from the contact plate (302) to the ball (304) and then unto the load cell transducer (306), with minimal loss of energy. Although disclosed as a spherical ball, the ball (304) may be any shape that allows the force upon the contact plate (302) to be concentrated to a small area and then transmitted to the load cell transducer (306) for reading and recordation of the force.

In some embodiments, the load cell assembly (300) may be adapted to travel up and down vertically within the housing (100), independent of the other components. This allows for the contact plate (302) to contact the upper end of the rocket assembly (200) regardless of the size of the pressure vessel (201). The load cell assembly (300) may be raised and lowered by an actuator mechanism (310, FIG. 4) using one or more vertical, linear rods. Like the base piston (500), this arrangement also allows for a variety of water rocket engines to be used of various volumes and shapes.

The apparatus may further comprise other features, such as temperature sensors and a time-of-flight sensor. The temperature sensors may read and record the temperatures within the housing, outside the housing, and within the pressure vessel (201). The time-of-flight sensor is a range imaging camera system that is capable of recording distance between the sensor and a target subject for each point of the image. This may allow for a user of the apparatus to measure the expansion of the pressure vessel (201) before and during launch, assisting in the analysis of the mechanical dynamics of the rocket assembly (200). Further, the user would be able to log any changes in the dimensions of the pressure vessel (201) after each launch of the rocket assembly (200). The recorded data prior to and during the launch of the rocket assembly (200) may be processed, using computer instructions and mathematical equations, to create graphs or tables detailing this information. The information may also be used to predict certain aspects of launch, such as flight path and maximum height of the launch.

METHOD OF USE

As disclosed above, the method of launching the water rocket within the fully assembled apparatus and recording the launch is, in an exemplary embodiment, as follows: attaching the rocket assembly (200) to the launcher assembly (400); attaching the launcher assembly (400) to the base piston (500) (if not previously attached); adding liquid to the pressure vessel (201) of the rocket assembly (200) (if not added prior to the attachment to the launcher assembly (400)); arming of the launcher assembly (400) by pressurization of an internal piston or use of an electrical signal, which locks the rocket assembly (200) in place; pressurization of the base piston (500), thereby raising the launcher assembly (400) and rocket assembly (200) to a position where the top of the rocket assembly (200) is in near proximity to the contact plate (302) of the load cell assembly (300); pressurization of the gas inside the pressure vessel (201) (including monitoring for pressure changes and adding or removing gas as necessary throughout the launch); lowering the load cell assembly (300), and/or further raising the launcher assembly (400) (as necessary) in order to ensure pre-launch contact between the upper end of the rocket assembly (200) and the contact plate (302) of the load cell assembly (300); simultaneously, or nearly simultaneously, activating the trigger mechanism (401) and thus opening the nozzle (202) whereby the pressurized gas within the pressure vessel (201) forces the liquid to exit through the nozzle (202) of the rocket assembly (200) generating thrust; activating the base piston (500), whereby the entire launcher assembly (400) is moved away from the liquid and air exiting through the nozzle (202) of the rocket assembly (200); and recording data prior to and throughout the simulated flight of the rocket assembly (200). This data may be further processed using computers and mathematical equations to generate charts, graphs, and/or tables detailing the launch information.

Figure 7C:
Figure 7D:
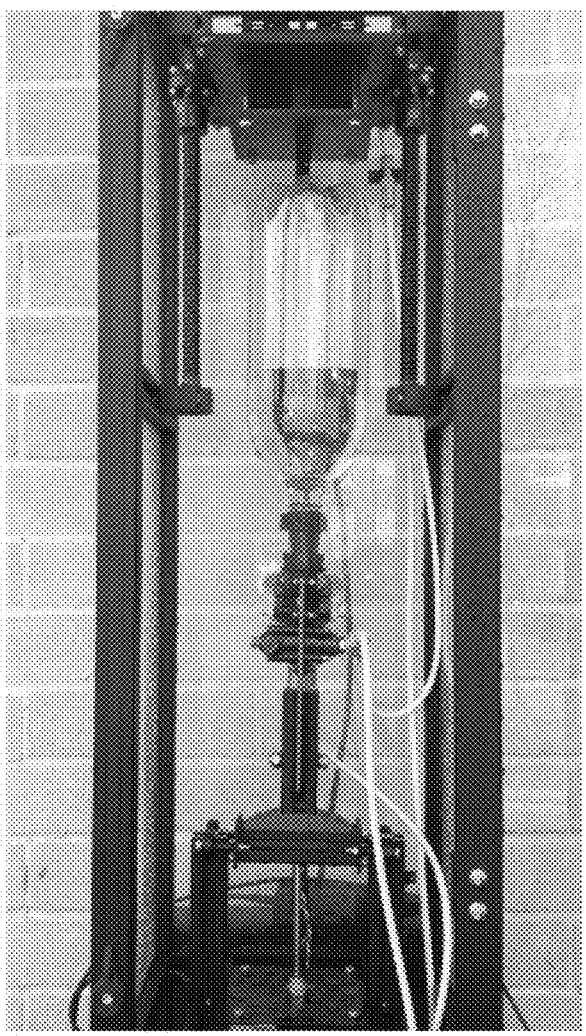
Figure 7E:
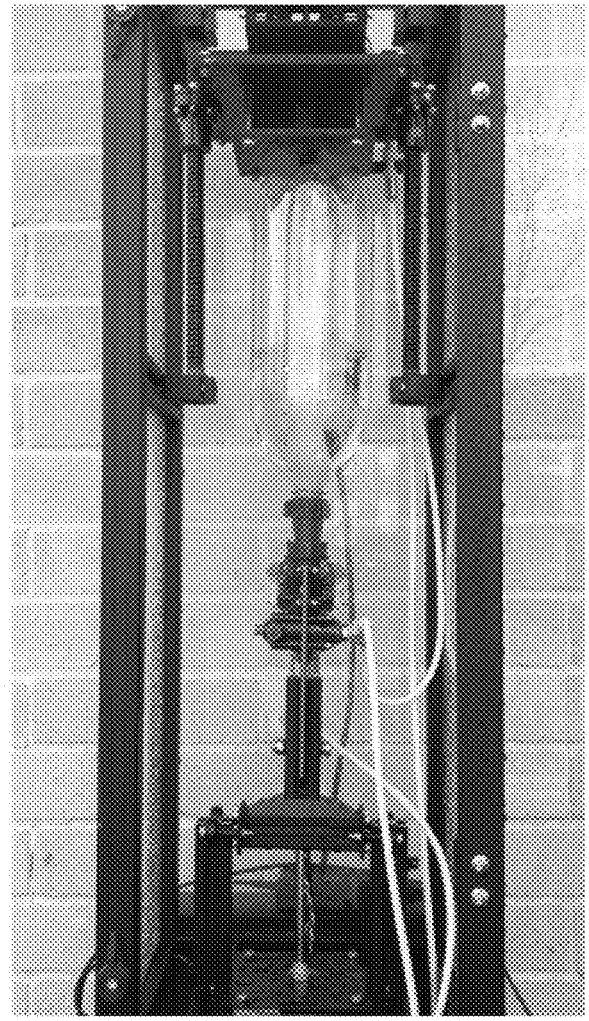
Figure 7F:
Figure 7G:
Figure 7H:
Figure 7I:
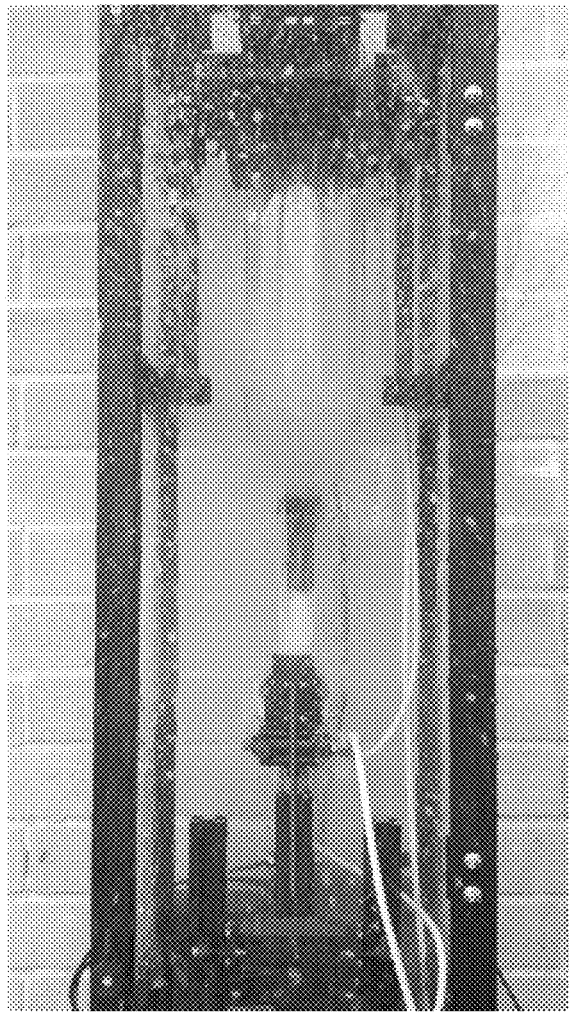
Figure 7J:
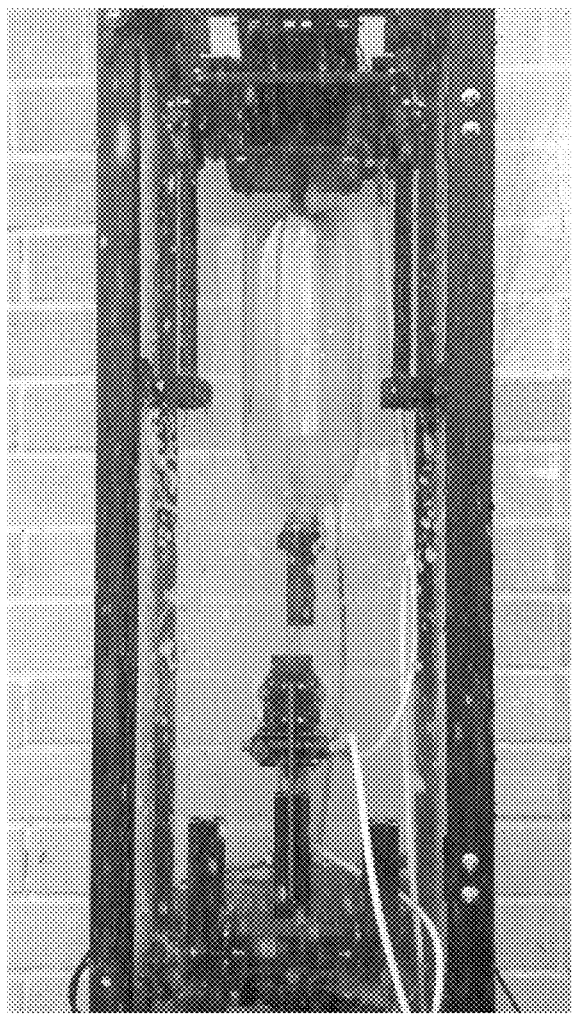
Figure 7K:
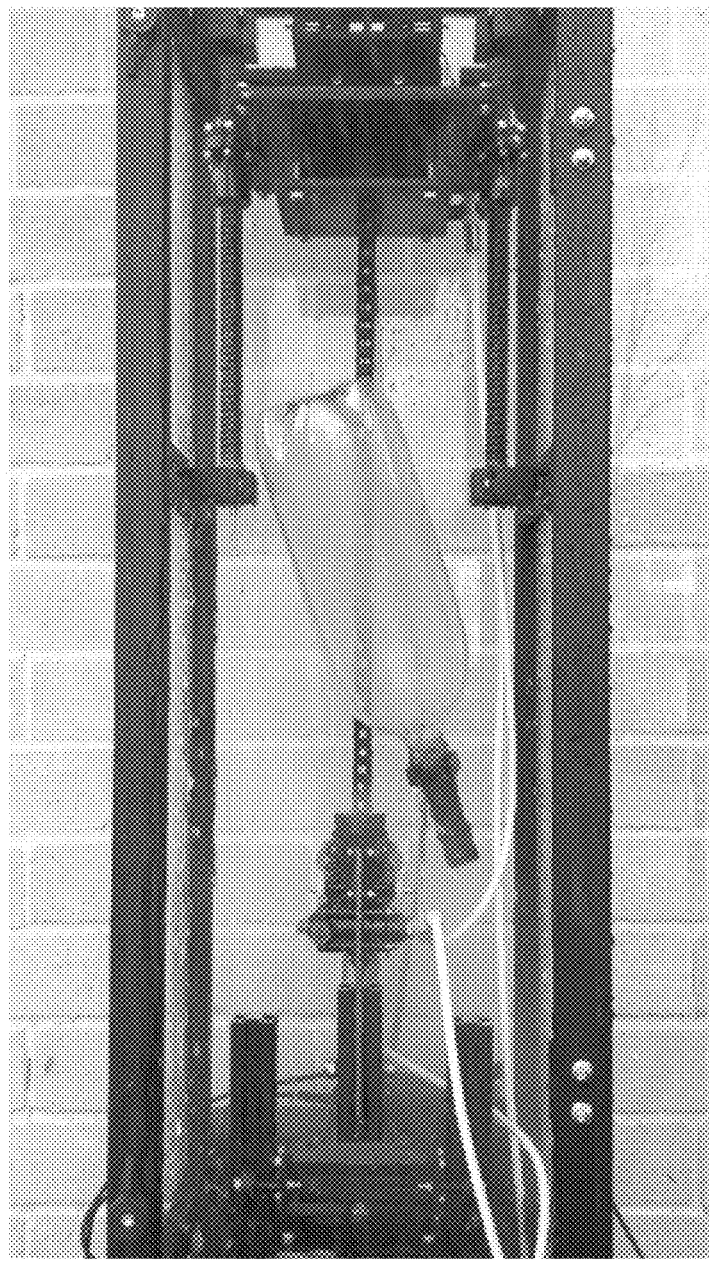

Referring to FIGS. 7A-7K, shown are photographs illustrating a typical launch sequence using the apparatus and method disclosed herein. FIG. 7A shows the apparatus prior to launch with the base piston (500) at its lowest position. In FIG. 7B, the base piston (500) is being raised so that pressure vessel (201) approaches the contact plate (302) of the load cell assembly (300). In FIG. 7C, the base piston (500) is fully raised with pressure vessel (201) near contact plate (302) of the load cell assembly (300). In FIG. 7D, the load cell assembly (300) has begun to move down and the contact plate is approaching the top of the pressure vessel (201). In FIG. 7E, the contact plate (302) of the load cell assembly (300) has just contacted the top of the pressure vessel (201) and the pressure vessel (201) has begun to be pressurized by adding gas. At this point, the load cell assembly (300) or rocket assembly (200) may optionally pull back up slightly to account for any change in the shape of the pressure vessel (201) due to pressurization. In FIG. 7F the pressure vessel (201) is at its final desired pressure, and the load cell assembly (300) is in its final launch position contacting the pressure vessel (201). However, if a pressure change is detected, and/or a separation develops between the contact plate (302) and the top of the pressure vessel (201), additional adjustments to the pressure and to the position of the contact plate can be made, automatically or manually, until launch. In FIG. 7G, the trigger mechanism (401) has just released the nozzle (202) and the nozzle (202) has been placed in the open position. In FIG. 7H, liquid is beginning to emerge from the nozzle (201) and the base piston (500), and launcher assembly (400) have begun to move downward and away from the rocket assembly (200). In FIG. 7I, the base piston (500) and launcher assembly (400) are in their lowest position and the launch is in full progress. Note that the rate of movement of the base piston (500) in FIGS. 7H and 7I is faster than the rate of movement in FIG. 7B due to the use of a flow regulator. In FIG. 7J, the gas pressure inside the pressure vessel (201) is nearly exhausted and the pressure vessel (201) has begun to fall away from the load cell assembly (300). Finally, in FIG. 7K, the launch sequence and the powered portion of the simulated flight are completed. It should be noted that thrust data may be collected from the load cell transducer throughout the entire launch sequence.

Although described above in connection with certain specific components, these descriptions are not intended to be limiting as various modifications may be made therein without departing from the spirit of the invention and within the scope and range of equivalent of the described embodiments. Encompassed embodiments of the present invention can be used in all applications where the testing of rockets of any type, or even other propulsion devices is desired or beneficial.

We claim:

1. An apparatus for testing a liquid propelled rocket comprising:
   a load cell assembly having a contact plate and a load cell transducer, the contact plate configured to transfer a force applied to the contact plate to the load cell transducer, the load cell transducer adapted to generate an electrical signal proportional to the force transferred to the load cell transducer by the contact plate;
   a rocket assembly having a top surface, a pressure vessel, and a nozzle, the nozzle being operable between a closed and an open position, the pressure vessel being adapted to receive a liquid and a gas and to maintain the liquid and gas combination under greater than atmospheric pressure when the nozzle is in the closed position;
   a launcher assembly having a trigger mechanism, the trigger mechanism adapted to receive the nozzle and configured to operate the nozzle between the open and closed positions, the trigger mechanism further adapted to engage with the nozzle when the nozzle is in the closed position, and to release the nozzle when the nozzle is in the open position;
   a base piston, the base piston attached to the trigger mechanism and configured to separate the trigger mechanism from the nozzle upon operation of the nozzle from the closed position to the open position;
   wherein, in a launch position, the rocket assembly is located below the load cell assembly, the nozzle is in the closed position and pointed in a downward direction, and the trigger mechanism is engaged with the nozzle; and
   wherein at least one of the load cell assembly, the rocket assembly, and the launcher assembly, are moveable in the vertical direction to cause the contact plate of the load cell assembly and the top surface of the rocket assembly to come into contact.

2. The apparatus of claim 1, wherein the base piston is further configured to move the rocket assembly and the launcher assembly in the direction of the load cell assembly.

3. The apparatus of claim 2, wherein the rate of movement of the base piston in the direction of the load cell assembly is lower than the rate of movement of the base piston when the base piston separates the trigger mechanism from the nozzle.

4. The apparatus of claim 1 further comprising a housing, the housing adapted to contain the load cell assembly, the rocket assembly, and the launcher assembly.

5. The apparatus of claim 4, wherein the housing further comprises a door, the door operable between an open position and a closed position.

6. The apparatus of claim 4, wherein the housing further comprises a lower surface and a drain located in the lower surface, the drain configured to permit liquid to flow from inside the housing to outside the housing.

7. A method for testing a liquid propelled rocket comprising the steps of:
   providing a load cell assembly having a contact plate and a load cell transducer, the contact plate configured to transfer a force applied to the contact plate to the load cell transducer, the load cell transducer adapted to generate an electrical signal proportional to the force transferred to the load cell transducer by the contact plate;
   providing a rocket assembly having a top surface, a pressure vessel, and a nozzle, the nozzle being operable between a closed and an open position, the pressure vessel being adapted to receive a liquid and a gas and to maintain the liquid and gas combination under greater than atmospheric pressure when the nozzle is in the closed position;
   providing a launcher assembly having a trigger mechanism, the trigger mechanism adapted to receive the nozzle and configured to operate the nozzle between the open and closed positions, the trigger mechanism further adapted to engage with the nozzle when the nozzle is in the closed position, and to release the nozzle when the nozzle is in the open position;
   providing a base piston, the base piston attached to the trigger mechanism and configured to separate the trigger mechanism from the nozzle upon operation of the nozzle from the closed position to the open position;
   wherein, in a launch position, the rocket assembly is located below the load cell assembly, the nozzle is in the closed position and pointed in a downward direction, and the trigger mechanism is engaged with the nozzle; and
   wherein at least one of the load cell assembly, the rocket assembly, and the launcher assembly, are moveable in the vertical direction to cause the contact plate of the load cell assembly and the top surface of the rocket assembly to come into contact;
   engaging the trigger mechanism with the nozzle with the nozzle in the open position;
   injecting an amount of liquid into the pressure vessel;
   injecting an amount of gas into the pressure vessel sufficient to create a higher than atmospheric pressure inside the pressure vessel;
   operating the nozzle to the closed position;
   moving the rocket assembly and the launcher assembly in the vertical direction until the contact plate of the load cell assembly and the top surface of the rocket assembly come into contact;
   operating the nozzle into the open position; and
   recording the electrical signal generated by the load cell transducer.

8. The method of claim 7, wherein the base piston is further configured to move the rocket assembly and the launcher assembly in the direction of the load cell assembly.

9. The method of claim 8, wherein the rate of movement of the base piston in the direction of the load cell assembly is lower than the rate of movement of the base piston when the base piston separates the trigger mechanism from the nozzle.

* * * * *